United States Patent
Teal et al.

(10) Patent No.: US 12,445,294 B2
(45) Date of Patent: Oct. 14, 2025

(54) MONITORING PROCESS DATA ACQUISITION AND EXFILTRATION

(71) Applicant: SOPHOS LIMITED, Abingdon (GB)

(72) Inventors: Daniel Montaque Teal, Austin, TX (US); Steven Braggs, Oxford (GB); Andrew James Thomas, Oxfordshire (GB)

(73) Assignee: Sophos Limited, Abingdon (GB)

( * ) Notice: Subject to any disclaimer, the term of this patent is extended or adjusted under 35 U.S.C. 154(b) by 218 days.

(21) Appl. No.: 18/334,974

(22) Filed: Jun. 14, 2023

(65) Prior Publication Data
US 2024/0422007 A1   Dec. 19, 2024

(51) Int. Cl.
H04L 9/32 (2006.01)
H04L 9/40 (2022.01)

(52) U.S. Cl.
CPC ........ H04L 9/3239 (2013.01); H04L 63/1425 (2013.01)

(58) Field of Classification Search
None
See application file for complete search history.

(56) References Cited

U.S. PATENT DOCUMENTS

| | | | | |
|---|---|---|---|---|
| 8,307,435 B1* | 11/2012 | Mann | | G06F 21/566 717/124 |
| 8,639,625 B1* | 1/2014 | Ginter | | G06F 21/78 705/50 |
| 9,507,621 B1* | 11/2016 | Allen | | G06F 9/45558 |
| 9,665,715 B1* | 5/2017 | Roundy | | G06F 21/552 |
| 10,503,904 B1* | 12/2019 | Singh | | G06F 21/566 |
| 11,979,422 B1* | 5/2024 | Kapoor | | G06F 21/554 |
| 2009/0158432 A1* | 6/2009 | Zheng | | G06F 21/53 726/24 |
| 2010/0031361 A1* | 2/2010 | Shukla | | G06F 21/567 726/24 |
| 2011/0167050 A1* | 7/2011 | Fanton | | H04L 9/0643 707/698 |

(Continued)

FOREIGN PATENT DOCUMENTS

JP   2023053359   4/2023

OTHER PUBLICATIONS

"Combined Search and Examination Report mailed in Application No. GB2408116.8", Oct. 17, 2024, 3 pages.

*Primary Examiner* — Kambiz Zand
*Assistant Examiner* — Mahabub S Ahmed
(74) *Attorney, Agent, or Firm* — IP Spring

(57) ABSTRACT

A computer-implemented method includes identifying one or more software processes that execute on the endpoint device and that perform at least one file operation including opening a file, reading the file, writing the file, or transmitting the file over a network. The method further includes storing for each software process of the one or more software processes identification information about the file. The method further includes responsive to determining that a triggering event has occurred, performing one or more actions including: preventing deletion of the file, determining one or more attributes of a suspicious process that accessed the file, requesting that a separate component analyze event journal records in relation to a time interval that overlaps with when the suspicious process accessed the file, or transmitting a cryptographic hash of the file to a server.

20 Claims, 5 Drawing Sheets

(56) References Cited

U.S. PATENT DOCUMENTS

| | | | |
|---|---|---|---|
| 2012/0254982 A1* | 10/2012 | Sallam | G06F 21/566 726/16 |
| 2012/0255000 A1* | 10/2012 | Sallam | G06F 21/566 726/23 |
| 2013/0055399 A1* | 2/2013 | Zaitsev | H04L 63/0263 726/25 |
| 2013/0305368 A1* | 11/2013 | Ford | G06F 21/566 726/23 |
| 2013/0312099 A1* | 11/2013 | Edwards | G06F 21/554 726/24 |
| 2015/0264077 A1* | 9/2015 | Berger | G06F 21/51 726/23 |
| 2015/0319183 A1* | 11/2015 | Liske | G06F 21/52 726/23 |
| 2016/0044054 A1* | 2/2016 | Stiansen | H04L 63/1416 726/24 |
| 2017/0032118 A1* | 2/2017 | Carson | G06F 21/566 |
| 2017/0032123 A1* | 2/2017 | Carson | G06F 21/52 |
| 2017/0061126 A1* | 3/2017 | Hooks | H04L 63/1416 |
| 2017/0223046 A1* | 8/2017 | Singh | H04L 63/1491 |
| 2017/0235966 A1* | 8/2017 | Ray | G06F 21/6218 713/165 |
| 2017/0346851 A1* | 11/2017 | Drake | H04L 9/0838 |
| 2018/0278631 A1* | 9/2018 | Harris | H04L 63/1416 |
| 2018/0351968 A1* | 12/2018 | MacLeod | G06F 21/568 |
| 2018/0351969 A1* | 12/2018 | MacLeod | G06F 11/2038 |
| 2019/0081962 A1* | 3/2019 | Teal | H04L 9/3247 |
| 2019/0173909 A1* | 6/2019 | Mixer | H04L 41/082 |
| 2019/0190936 A1* | 6/2019 | Thomas | H04L 51/212 |
| 2019/0260795 A1* | 8/2019 | Araiza | H04L 63/1441 |
| 2019/0385057 A1* | 12/2019 | Litichever | H04L 63/14 |
| 2020/0244673 A1* | 7/2020 | Stockdale | H04L 63/1433 |
| 2020/0302058 A1* | 9/2020 | Kenyon | G06F 21/554 |
| 2020/0304528 A1* | 9/2020 | Ackerman | H04L 63/1433 |
| 2020/0336503 A1* | 10/2020 | Xu | G06F 11/0772 |
| 2021/0200593 A1* | 7/2021 | Allyn | G06F 9/5022 |
| 2021/0273961 A1* | 9/2021 | Humphrey | H04L 63/1441 |
| 2021/0360027 A1* | 11/2021 | Boyer | H04L 51/212 |
| 2021/0400071 A1* | 12/2021 | Ray | H04L 63/1441 |
| 2023/0012220 A1* | 1/2023 | Humphrey | G06F 21/53 |
| 2023/0252144 A1* | 8/2023 | Kim | G06F 21/564 726/23 |
| 2024/0205256 A1* | 6/2024 | Tormasov | H04L 63/1425 |
| 2024/0223596 A1* | 7/2024 | Sellars | H04L 63/1433 |
| 2024/0259416 A1* | 8/2024 | Miyake | H04L 63/102 |

* cited by examiner

500

```
┌─────────────────────────────────────────────────────────┐
│ Identify, with a kernel-mode driver executing on an     │
│ endpoint device, one or more software processes that    │
│ execute on the endpoint device and that perform at      │
│ least one file operation selected from the group of     │
│ opening a file, reading the file, writing the file,     │
│ transmitting the file over a network, and combinations  │
│ thereof 502                                             │
│ ┌─ ─ ─ ─ ─ ─ ─ ─ ─ ─ ─ ─ ─ ─ ─ ─ ─ ─ ─ ─ ─ ─ ─ ─ ─ ┐ │
│ │ where responsive to identifying that the file    │ │
│ │ operation comprises transmitting the file over    │ │
│ │ the network, a filter is applied to determine     │ │
│ │ information about the file that is transmitted    │ │
│ │ over the network                                  │ │
│ └─ ─ ─ ─ ─ ─ ─ ─ ─ ─ ─ ─ ─ ─ ─ ─ ─ ─ ─ ─ ─ ─ ─ ─ ─ ┘ │
└─────────────────────────────────────────────────────────┘
                            │
                            ▼
┌─────────────────────────────────────────────────────────┐
│ Store, in a kernel space of an operating system on the  │
│ endpoint device, for each software process of the one   │
│ or more software processes identification information   │
│ about the file 504                                      │
│                                                         │
│ ┌─ ─ ─ ─ ─ ─ ─ ─ ─ ─ ─ ─ ─ ─ ─ ─ ─ ─ ─ ─ ─ ─ ─ ─ ─ ┐ │
│ │ where the information about the file includes    │ │
│ │ one or more selected from the group of a          │ │
│ │ checksum of the file, a sample of the file, a     │ │
│ │ file name, and a memory location associated       │ │
│ │ with reading the file                             │ │
│ └─ ─ ─ ─ ─ ─ ─ ─ ─ ─ ─ ─ ─ ─ ─ ─ ─ ─ ─ ─ ─ ─ ─ ─ ─ ┘ │
└─────────────────────────────────────────────────────────┘
                            │
                            ▼
┌─────────────────────────────────────────────────────────┐
│ Responsive to determining that a triggering event has   │
│ occurred, perform one or more actions selected from     │
│ the group of:                                           │
│ • Preventing deletion of the file                       │
│ • Determining one or more attributes of a suspicious    │
│   process that accessed the file                        │
│ • Requesting that a separate component analyze event    │
│   journal records in relation to a time interval that   │
│   overlaps with when the suspicious process accessed    │
│   the file                                              │
│ • Transmitting a cryptographic hash of the file to a    │
│   server, and                                           │
│ • Combinations thereof 506                              │
└─────────────────────────────────────────────────────────┘
```

FIG 5

MONITORING PROCESS DATA ACQUISITION AND EXFILTRATION

FIELD

Embodiments relate generally to monitoring data acquisition and exfiltration of processes. More particularly, embodiments relate to methods, systems, and computer readable media that use a kernel-mode driver to identify and track processes that execute on an endpoint device.

BACKGROUND

When a user double-clicks (or performs another action) to initiate execution of a program, a process is created. When a malicious threat infiltrates a computer and manipulates a particular process, it may be difficult to determine that a risk is present. Furthermore, once a malicious threat has damaged the computer, it may be difficult to determine how the malicious threat accessed the computer and exactly what the malicious threat did with the process.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A computer-implemented method is performed at an endpoint device includes identifying, with a kernel-mode driver executing on the endpoint device, one or more software processes that execute on the endpoint device and that perform at least one file operation selected from the group of opening a file, reading the file, writing the file, transmitting the file over a network, and combinations thereof. The method further includes storing, in a kernel space of an operating system on the endpoint device, for each software process of the one or more software processes identification information about the file. The method further includes responsive to determining that a triggering event has occurred, performing one or more actions selected from the group of: preventing deletion of the file, determining one or more attributes of a suspicious process that accessed the file, requesting that a separate component analyze event journal records in relation to a time interval that overlaps with when the suspicious process accessed the file, transmitting a cryptographic hash of the file to a server, and combinations thereof.

In some embodiments, responsive to identifying that the file operation comprises transmitting the file over the network, the method further comprises: applying a filter to determine information about the file that is transmitted over the network. In some embodiments, the method further includes storing, in the kernel space of the operating system on the endpoint device, for each software process of the one or more software processes, information about a memory location in the kernel space associated with the software process or a memory descriptor list that describes a physical memory location of a buffer associated with the software process. In some embodiments, the one or more actions comprise requesting that the separate component analyze the event journal records and the method further comprises: determining an amount of data received from the network prior to the file being created, determining if the amount of data received from the network matches a size of the file, and responsive to determining that the amount of data received matches the size of the file, identifying the one or more software processes as suspicious. In some embodiments, responsive to the triggering event including determining the one or more attributes of the suspicious process that accessed the file, the method further comprises: identifying a website that was visited from the endpoint device. In some embodiments, the cryptographic hash is a first cryptographic hash, and further comprising: responsive to the one or more software processes opening the first file, generating a first cryptographic hash of a portion of the first file, responsive to the one or more software processes transmitting a second file, generating a second cryptographic hash of the second file, and determining that the first cryptographic hash matches the second cryptographic hash and identifying the one or more software processes that performed the transmitting the second file over the network is suspicious. In some embodiments, the cryptographic hash is a first cryptographic hash, and further comprising: responsive to the one or more software processes opening the first file, generating a first cryptographic hash of a portion of the first file, responsive to the one or more software processes transmitting a second file, generating a second cryptographic hash of the second file, responsive to determining that the first cryptographic hash does not match the second cryptographic hash, identifying a code library that was accessed before the second file was transmitted, and based on determining that the code library includes compression or encryption functionality, tagging the one or more software processes as suspicious. In some embodiments, the method further includes responsive to tagging the one or more software processes as suspicious, preventing deletion of the first file. In some embodiments, the identification information about the software process includes one or more selected from the group of a checksum of the file, a sample of the file, a name of the file, and a memory location associated with reading the file.

A system comprises one or more processors and one or more computer-readable media, having instructions stored thereon that, when executed by the one or more processors, cause the one or more processors to perform operations comprising: identifying, with a kernel-mode driver executing on the endpoint device, one or more software processes that execute on the endpoint device and that perform at least one file operation of opening a file, reading the file, writing the file, or transmitting the file over a network, storing, in a cache in a kernel space of an operating system on the endpoint device, for each software process of the one or more software processes identification information about the file, and responsive to determining that a triggering event has occurred, performing one or more actions selected from the group of: preventing deletion of the file, determining one or more attributes of a suspicious process that accessed the file, requesting that a separate component analyze event journal records in relation to a time interval that overlaps with when the suspicious process accessed the file, transmitting a cryptographic hash of the file to a server, and combinations thereof.

In some embodiments, the operations further comprise applying a filter to determine information about the file that is transmitted over the network. In some embodiments, the operations further comprise storing, in the cache in the kernel space of the operating system on the endpoint device, for each software process of the one or more software processes, information about a memory location in the kernel space associated with the software process or a memory descriptor list that describes a physical memory location of a buffer associated with the software process. In some embodiments, the one or more actions comprise requesting that the separate component analyze the event journal records and the operations further comprise: determining an amount of data received from the network prior to the file being created, determining if the amount of data received from the network matches a size of the file, and responsive to determining that the amount of data received matches the size of the file, identifying the one or more software processes as suspicious. In some embodiments, responsive to the triggering event including determining the one or more attributes of the suspicious process that accessed the file, the operations further include identifying a website that was visited from the endpoint device. In some embodiments, the operations further comprise: responsive to the one or more software processes opening a first file, generating a first cryptographic hash of a portion of the first file, responsive to the one or more software processes transmitting a second file, generating a second cryptographic hash of the second file, and determining that the first cryptographic hash matches the second cryptographic hash and identifying the one or more software processes that performed the transmitting the second file over the network is suspicious.

A computer-program product that includes one or more non-transitory computer-readable media with instructions stored thereon that, when executed by one or more computers, cause the one or more computers to perform operations comprising: identifying, with a kernel-mode driver executing on the endpoint device, one or more software processes that execute on the endpoint device and that perform at least one file operation of opening a file, reading the file, writing the file, or transmitting the file over a network, storing, in a cache in a kernel space of an operating system on the endpoint device, for each software process of the one or more software processes identification information about the file, and responsive to determining that a triggering event has occurred, performing one or more actions selected from the group of: preventing deletion of the file, determining one or more attributes of a suspicious process that accessed the file, requesting that a separate component analyze event journal records in relation to a time interval that overlaps with when the suspicious process accessed the file, transmitting a cryptographic hash of the file to a server, and combinations thereof.

In some embodiments, the operations further comprise applying a filter to determine information about the file that is transmitted over the network. In some embodiments, the operations further comprise storing, in the cache in the kernel space of the operating system on the endpoint device, for each software process of the one or more software processes, information about a memory location in the kernel space associated with the software process or a memory descriptor list that describes a physical memory location of a buffer associated with the software process. In some embodiments, the one or more actions comprise requesting that the separate component analyze the event journal records and the operations further comprise: determining an amount of data received from the network prior to the file being created, determining if the amount of data received from the network matches a size of the file, and responsive to determining that the amount of data received matches the size of the file, identifying the one or more software processes as suspicious. In some embodiments, responsive to the triggering event including determining the one or more attributes of the suspicious process that accessed the file, the operations further include identifying a website that was visited from the endpoint device.

BRIEF DESCRIPTION OF THE DRAWINGS

FIG. 5 is an example flow diagram of a method to monitor data acquisition and exfiltration, according to some embodiments described herein.

DETAILED DESCRIPTION

Example Network Environment 100

Figure 1:
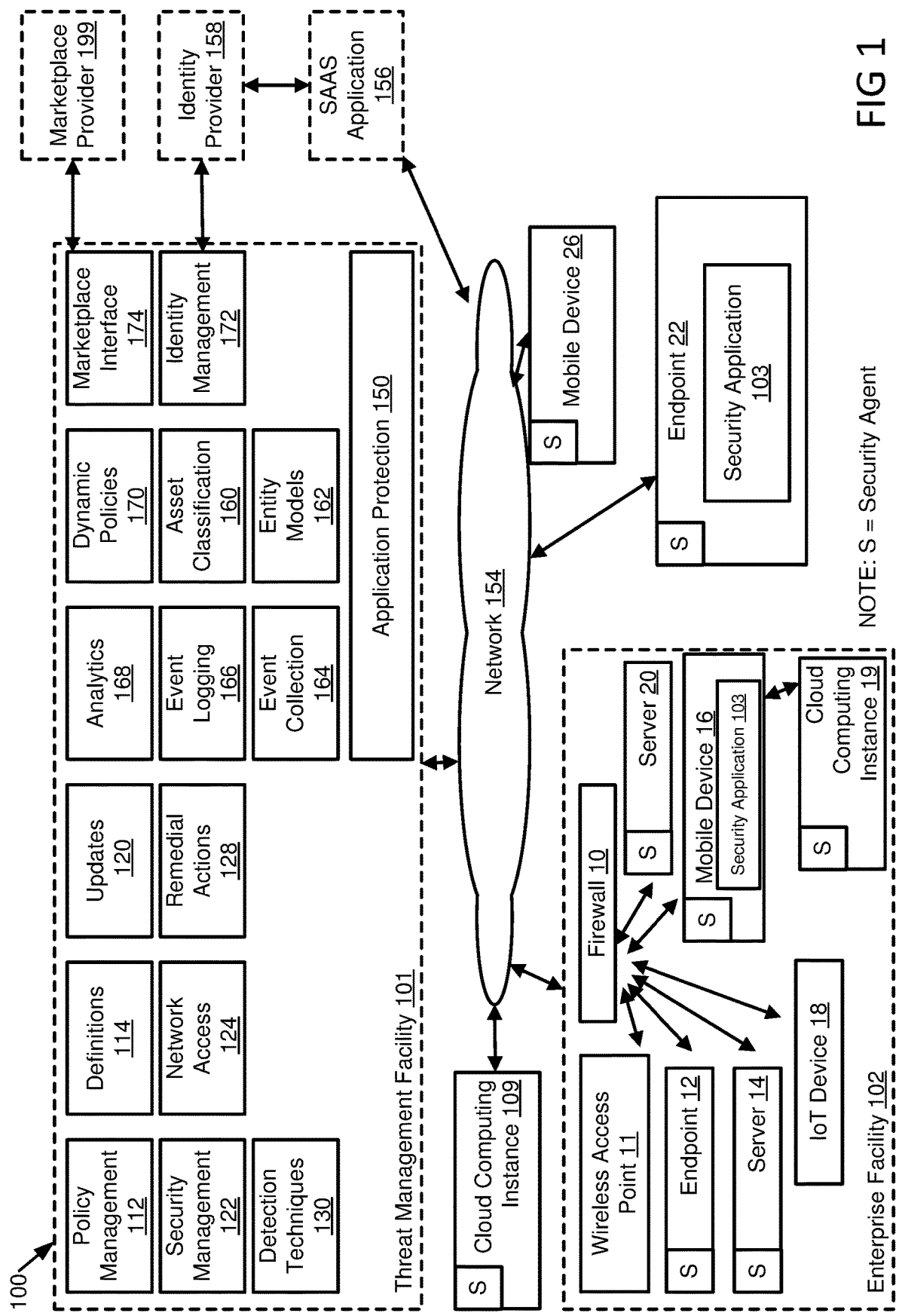
FIG. 1 is a block diagram of a threat management system in a network environment, according to some embodiments described herein.

FIG. 1 depicts a block diagram of a threat management system 100 providing protection against a plurality of threats, such as malware, viruses, spyware, cryptoware, adware, ransomware, trojans, spam, intrusion, policy abuse, improper configuration, vulnerabilities, improper access, uncontrolled access, and more. A threat management facility or network monitor 100 may communicate with, coordinate, and control operation of security functionality at different control points, layers, and levels within the system 100. A number of capabilities may be provided by the threat management facility 101, with an overall goal to intelligently monitor network traffic from endpoints/hosts to known security product update sites. The threat management facility 101 can monitor the traffic passively and analyze the traffic. The threat management facility 101 may be or may include a gateway such as a web security appliance that is actively routing and/or assessing the network requests for security purposes. Another overall goal is to provide protection needed by an organization that is dynamic and able to adapt to changes in compute instances and new threats due to personal or unmanaged devices using the enterprise network. According to various aspects, the threat management facility 101 may provide protection from a variety of threats to a variety of compute instances in a variety of locations and network configurations.

As one example, users of the threat management facility 101 may define and enforce policies that control access to and use of compute instances, networks, and data. Administrators may update policies such as by designating authorized users and conditions for use and access. The threat management facility 101 may update and enforce those policies at various levels of control that are available, such as by directing compute instances to control the network traffic that is allowed to traverse firewalls and wireless access points, applications, and data available from servers, applications, and data permitted to be accessed by endpoints, and network resources and data permitted to be run and used by endpoints. The threat management facility 101 may provide many different services, and policy management may be offered as one of the services.

Turning to a description of certain capabilities and components of the threat management system 100, an example enterprise facility 102 may be or may include any networked computer-based infrastructure. For example, the enterprise facility 102 may be corporate, commercial, organizational, educational, governmental, or the like. As home networks can also include more compute instances at home and in the cloud, an enterprise facility 102 may also or instead include a personal network such as a home or a group of homes. The enterprise facility's 102 computer network may be distributed amongst a plurality of physical premises, such as buildings on a campus, and located in one or in a plurality of geographical locations. The configuration of the enterprise facility as shown as one example, and it will be understood that there may be any number of compute instances, less or more of each type of compute instances, and other types of compute instances.

As shown, the example enterprise facility includes a firewall 10, a wireless access point 11, an endpoint 12, a server 14, a mobile device 16, an appliance or Internet-of-Things (IoT) device 18, a cloud computing instance 19, and a server 20. One or more of 10-20 may be implemented in hardware (e.g., a hardware firewall, a hardware wireless access point, a hardware mobile device, a hardware IoT device, a hardware etc.) or in software (e.g., a virtual machine configured as a server or firewall or mobile device). While FIG. 1 shows various elements 10-20, these are for example only, and there may be any number or types of elements in a given enterprise facility. For example, in addition to the elements depicted in the enterprise facility 102, there may be one or more gateways, bridges, wired networks, wireless networks, virtual private networks, virtual machines or compute instances, computers, and so on.

The threat management facility 101 may include certain facilities, such as a policy management facility 112, security management facility 122, update facility 120, definitions facility 114, network access rules facility 124, remedial action facility 128, detection techniques facility 130, application protection facility 150, asset classification facility 160, entity model facility 162, event collection facility 164, event logging facility 166, analytics facility 168, dynamic policies facility 170, identity management facility 172, and marketplace management facility 174, as well as other facilities. For example, there may be a testing facility, a threat research facility, and other facilities. It should be understood that the threat management facility 101 may be implemented in whole or in part on a number of different compute instances, with some parts of the threat management facility on different compute instances in different locations. For example, some or all of one or more of the various facilities 100, 112-174 may be provided as part of a security agent S that is included in software executing on a compute instance 10-26 within the enterprise facility. Some or all of one or more of the facilities 100, 112-174 may be provided on the same physical hardware or logical resource as a gateway, such as a firewall 10, or wireless access point 11. Some or all of one or more of the facilities may be provided on one or more cloud servers that are operated by the enterprise or by a security service provider, such as the cloud computing instance 109.

In various implementations, a marketplace provider 199 may make available one or more additional facilities to the enterprise facility 102 via the threat management facility 101. The marketplace provider may communicate with the threat management facility 101 via the marketplace interface facility 174 to provide additional functionality or capabilities to the threat management facility 101 and compute instances 10-26. As examples, the marketplace provider 199 may be a third-party information provider, such as a physical security event provider; the marketplace provider 199 may be a system provider, such as a human resources system provider or a fraud detection system provider; the marketplace provider may be a specialized analytics provider; and so on. The marketplace provider 199, with appropriate permissions and authorization, may receive and send events, observations, inferences, controls, convictions, policy violations, or other information to the threat management facility. For example, the marketplace provider 199 may subscribe to and receive certain events, and in response, based on the received events and other events available to the marketplace provider 199, send inferences to the marketplace interface, and in turn to the analytics facility 168, which in turn may be used by the security management facility 122. According to some implementations, the marketplace provider 199 is a trusted security vendor that can provide one or more security software products to any of the compute instances described herein. In this manner, the marketplace provider 199 may include a plurality of trusted security vendors that are used by one or more of the illustrated compute instances.

The identity provider 158 may be any remote identity management system or the like configured to communicate with an identity management facility 172, e.g., to confirm identity of a user as well as provide or receive other information about users that may be useful to protect against threats. In general, the identity provider may be any system or entity that creates, maintains, and manages identity information for principals while providing authentication services to relying party applications, e.g., within a federation or distributed network. The identity provider may, for example, offer user authentication as a service, where other applications, such as web applications, outsource the user authentication step to a trusted identity provider.

The identity provider 158 may provide user identity information, such as multi-factor authentication, to a software-as-a-service (SaaS) application. Centralized identity providers may be used by an enterprise facility instead of maintaining separate identity information for each application or group of applications, and as a centralized point for integrating multifactor authentication. The identity management facility 172 may communicate hygiene, or security risk information, to the identity provider 158. The identity management facility 172 may determine a risk score for a particular user based on events, observations, and inferences about that user and the compute instances associated with the user. If a user is perceived as risky, the identity management facility 172 can inform the identity provider 158, and the identity provider 158 may take steps to address the potential risk, such as to confirm the identity of the user, confirm that the user has approved the SaaS application access, remediate the user's system, or such other steps as may be useful.

The threat protection provided by the threat management facility 101 may extend beyond the network boundaries of the enterprise facility 102 to include clients (or client facilities) such as an endpoint 22 outside the enterprise facility 102, a mobile device 26, a cloud computing instance 109, or any other devices, services or the like that use network connectivity not directly associated with or controlled by the enterprise facility 102, such as a mobile network, a public cloud network, or a wireless network at a hotel or coffee shop. While threats may come from a variety of sources, such as from network threats, physical proximity threats, secondary location threats, the compute instances 10-26 may be protected from threats even when a compute instance 10-26 is not connected to the enterprise facility 102 network, such as when compute instances 22, 26 use a network that is outside of the enterprise facility 102 and separated from the enterprise facility 102, e.g., by a gateway, a public network, and so forth. In some implementations, the endpoint 22 and/or the mobile device 26 include a security application 103 that is discussed in greater detail below.

In some implementations, compute instances 10-26 may communicate with cloud applications, such as SaaS application 156. The SaaS application 156 may be an application that is used by but not operated by the enterprise facility 102. Example commercially available SaaS applications 156 include Salesforce, Amazon Web Services (AWS) applications, Google Apps applications, Microsoft Office 365® applications, and so on. A given SaaS application 156 may communicate with an identity provider 158 to verify user identity consistent with the requirements of the enterprise facility 102. The compute instances 10-26 may communicate with an unprotected server (not shown) such as a web site or a third-party application through an internetwork 154 such as the Internet or any other public network, private network or combination of these.

Aspects of the threat management facility 101 may be provided as a stand-alone solution. In other implementations, aspects of the threat management facility 101 may be integrated into a third-party product. An application programming interface (e.g., a source code interface) may be provided such that aspects of the threat management facility 101 may be integrated into or used by or with other applications. For instance, the threat management facility 101 may be stand-alone in that it provides direct threat protection to an enterprise or computer resource, where protection is subscribed to directly. Alternatively, the threat management facility may offer protection indirectly, through a third-party product, where an enterprise may subscribe to services through the third-party product, and threat protection to the enterprise may be provided by the threat management facility 101 through the third-party product.

The security management facility 122 may provide protection from a variety of threats by providing, as non-limiting examples, endpoint security and control, email security and control, web security and control, reputation-based filtering, machine learning classification, control of unauthorized users, control of guest and non-compliant computers, and more.

The security management facility 122 may provide malicious code protection to a compute instance. The security management facility 122 may include functionality to scan applications, files, and data for malicious code, remove or quarantine applications and files, prevent certain actions, perform remedial actions, as well as other security measures. Scanning may use any of a variety of techniques, including without limitation signatures, identities, classifiers, and other suitable scanning techniques. In some implementations, the scanning may include scanning some or all files on a periodic basis, scanning an application when the application is executed, scanning data transmitted to or from a device, scanning in response to predetermined actions or combinations of actions, and so forth. The scanning of applications, files, and data may be performed to detect known or unknown malicious code or unwanted applications. Aspects of the malicious code protection may be provided, for example, in the security agent of an endpoint 12, in a wireless access point 11 or firewall 10, as part of application protection 150 provided by the cloud, and so on.

In an implementation, the security management facility 122 may provide for email security and control, for example to target spam, viruses, spyware and phishing, to control email content, and the like. Email security and control may protect against inbound and outbound threats, protect email infrastructure, prevent data leakage, provide spam filtering, and more. Aspects of the email security and control may be provided, for example, in the security agent of an endpoint 12, in a wireless access point 11 or firewall 10, as part of application protection 150 provided by the cloud, and so on.

In an implementation, security management facility 122 may provide for web security and control, for example, to detect or block viruses, spyware, malware, unwanted applications, help control web browsing, and the like, which may provide comprehensive web access control enabling safe, productive web browsing. Web security and control may provide Internet use policies, reporting on suspect compute instances, security and content filtering, active monitoring of network traffic, uniform resource identifier (URI) filtering, and the like. Aspects of the web security and control may be provided, for example, in the security agent of an endpoint 12, in a wireless access point 11 or firewall 10, as part of application protection 150 provided by the cloud, and so on.

According to one implementation, the security management facility 122 may provide for network monitoring and access control, which generally controls access to and use of network connections, while also allowing for monitoring as described herein. Network control may stop unauthorized, guest, or non-compliant systems from accessing networks, and may control network traffic that is not otherwise controlled at the client level. In addition, network access control may control access to virtual private networks (VPN), where VPNs may, for example, include communications networks tunneled through other networks and establishing logical connections acting as virtual networks. According to various implementations, a VPN may be treated in the same manner as a physical network. Aspects of network access control may be provided, for example, in the security agent of an endpoint 12, in a wireless access point 11 or firewall 10, as part of application protection 150 provided by the cloud, e.g., from the threat management facility 101 or other network resource(s).

The security management facility 122 may also provide for host intrusion prevention through behavioral monitoring and/or runtime monitoring, which may guard against unknown threats by analyzing application behavior before or as an application runs. This may include monitoring code behavior, application programming interface calls made to libraries or to the operating system, or otherwise monitoring application activities. Monitored activities may include, for example, reading and writing to memory, reading and writing to disk, network communication, process interaction, and so on. Behavior and runtime monitoring may intervene if code is deemed to be acting in a manner that is suspicious or malicious. Aspects of behavior and runtime monitoring may be provided, for example, in the security agent of an endpoint 12, in a wireless access point 11 or firewall 10, as part of application protection 150 provided by the cloud, and so on.

The security management facility 122 may provide also for reputation filtering, which may target or identify sources of known malware. For instance, reputation filtering may include lists of URIs of known sources of malware or known suspicious internet protocol (IP) addresses, code authors, code signers, or domains, that when detected may invoke an action by the threat management facility 101. Based on reputation, potential threat sources may be blocked, quarantined, restricted, monitored, or some combination of these, before an exchange of data can be made. Aspects of reputation filtering may be provided, for example, in the security agent of an endpoint 12, in a wireless access point 11 or firewall 10, as part of application protection 150 provided by the cloud, and so on. In some implementations, some reputation information may be stored on a compute instance 10-26, and other reputation data available through cloud lookups to an application protection lookup database, such as may be provided by application protection 150.

In some implementations, information may be sent from the enterprise facility 102 to a third party, such as a security vendor, or the like, which may lead to improved performance of the threat management facility 101. In general, feedback may be useful for any aspect of threat detection. For example, the types, times, and number of virus interactions that an enterprise facility 102 experiences may provide useful information for the preventions of future virus threats. Feedback may also be associated with behaviors of individuals within the enterprise, such as being associated with most common violations of policy, network access, unauthorized application loading, unauthorized external device use, and the like. Feedback may enable the evaluation or profiling of client actions that are violations of policy that may provide a predictive model for the improvement of enterprise policies as well as detection of emerging security threats.

An update management facility 120 may provide control over when updates are performed. The updates may be automatically transmitted, manually transmitted, or some combination of these. Updates may include software, definitions, reputations or other code or data that may be useful to the various facilities. For example, the update facility 120 may manage receiving updates from a provider, distribution of updates to enterprise facility 102 networks and compute instances, or the like. In some implementations, updates may be provided to the enterprise facility's 102 network, where one or more compute instances on the enterprise facility's 102 network may distribute updates to other compute instances.

According to some implementations, network traffic associated with the update facility functions may be monitored to determine that personal devices and/or unmanaged devices are appropriately applying security updates. In this manner, even unmanaged devices may be monitored to determine that appropriate security patches, software patches, virus definitions, and other similar code portions are appropriately updated on the unmanaged devices.

The threat management facility 101 may include a policy management facility 112 that manages rules or policies for the enterprise facility 102. Example rules include access permissions associated with networks, applications, compute instances, users, content, data, and the like. The policy management facility 112 may use a database, a text file, other data store, or a combination to store policies. A policy database may include a block list, a black list, an allowed list, a white list, and more. As non-limiting examples, policies may include a list of enterprise facility 102 external network locations/applications that may or may not be accessed by compute instances, a list of types/classifications of network locations or applications that may or may not be accessed by compute instances, and contextual rules to evaluate whether the lists apply. For example, there may be a rule that does not permit access to sporting websites. When a website is requested by the client facility, a security management facility 122 may access the rules within a policy facility to determine if the requested access is related to a sporting website.

The policy management facility 112 may include access rules and policies that are distributed to maintain control of access by the compute instances 10-26 to network resources. Example policies may be defined for an enterprise facility, application type, subset of application capabilities, organization hierarchy, compute instance type, user type, network location, time of day, connection type, or any other suitable definition. Policies may be maintained through the threat management facility 101, in association with a third party, or the like. For example, a policy may restrict instant messaging (IM) activity by limiting such activity to support personnel when communicating with customers. More generally, this may allow communication for departments as necessary or helpful for department functions, but may otherwise preserve network bandwidth for other activities by restricting the use of IM to personnel that need access for a specific purpose. In one implementation, the policy management facility 112 may be a stand-alone application, may be part of the network server facility 142, may be part of the enterprise facility 102 network, may be part of the client facility, or any suitable combination of these.

The policy management facility 112 may include dynamic policies that use contextual or other information to make security decisions. As described herein, the dynamic policies facility 170 may generate policies dynamically based on observations and inferences made by the analytics facility. The dynamic policies generated by the dynamic policy facility 170 may be provided by the policy management facility 112 to the security management facility 122 for enforcement.

The threat management facility 101 may provide configuration management as an aspect of the policy management facility 112, the security management facility 122, or a combination thereof. Configuration management may define acceptable or required configurations for the compute instances 10-26, applications, operating systems, hardware, or other assets, and manage changes to these configurations. Assessment of a configuration may be made against standard configuration policies, detection of configuration changes, remediation of improper configurations, application of new configurations, and so on. An enterprise facility may have a set of standard configuration rules and policies for particular compute instances which may represent a desired state of the compute instance. For example, on a given compute instance 12, 14, 18, a version of a client firewall may be required to be running and installed. If the required version is installed but in a disabled state, the policy violation may prevent access to data or network resources. A remediation may be to enable the firewall. In another example, a configuration policy may disallow the use of uniform serial bus (USB) disks, and policy management 112 may require a configuration that turns off USB drive access via a registry key of a compute instance. Aspects of configuration management may be provided, for example, in the security agent of an endpoint 12, in a wireless access point 11 or firewall 10, as part of application protection 150 provided by the cloud, or any combination of these.

The policy management facility 112 may also require update management (e.g., as provided by the update facility 120). Update management for the security facility 122 and policy management facility 112 may be provided directly by the threat management facility 101, or, for example, by a hosted system. In some implementations, the threat management facility 101 may also provide for patch management, where a patch may be an update to an operating system, an application, a system tool, or the like, where one of the reasons for the patch is to reduce vulnerability to threats.

In some implementations, the security facility 122 and policy management facility 112 may push information to the enterprise facility 102 network and/or the compute instances 10-26, the enterprise facility 102 network and/or compute instances 10-26 may pull information from the security facility 122 and policy management facility 112, or there may be a combination of pushing and pulling of information. For example, the enterprise facility 102 network and/or compute instances 10-26 may pull update information from the security facility 122 and policy management facility 112 via the update facility 120, an update request may be based on a time period, by a certain time, by a date, on demand, or the like. In another example, the security facility 122 and policy management facility 112 may push the information to the enterprise facility's 102 network and/or compute instances 10-26 by providing notification that there are updates available for download and/or transmitting the information. In one implementation, the policy management facility 112 and the security facility 122 may work in concert with the update management facility 120 to provide information to the enterprise facility's 102 network and/or compute instances 10-26. In various implementations, policy updates, security updates, and other updates may be provided by the same or different modules, which may be the same or separate from a security agent running on one of the compute instances 10-26. Furthermore, the policy updates, security updates, and other updates may be monitored through network traffic to determine if endpoints or compute instances 10-26 correctly receive the associated updates.

As threats are identified and characterized, the definition facility 114 of the threat management facility 101 may manage definitions used to detect and remediate threats. For example, identity definitions may be used for recognizing features of known or potentially malicious code and/or known or potentially malicious network activity. Definitions also may include, for example, code or data to be used in a classifier, such as a neural network or other classifier that may be trained using machine learning. Updated code or data may be used by the classifier to classify threats. In some implementations, the threat management facility 101 and the compute instances 10-26 may be provided with new definitions periodically to include most recent threats. Updating of definitions may be managed by the update facility 120 and may be performed upon request from one of the compute instances 10-26, upon a push, or some combination. Updates may be performed at a specific a time period, on demand from a device 10-26, upon determination of an important new definition or a number of definitions, and so on.

A threat research facility (not shown) may provide a continuously ongoing effort to maintain the threat protection capabilities of the threat management facility 101 in light of continuous generation of new or evolved forms of malware. Threat research may be provided by researchers and analysts working on known threats, in the form of policies, definitions, remedial actions, and so on.

The security management facility 122 may scan an outgoing file and verify that the outgoing file is permitted to be transmitted according to policies. By checking outgoing files, the security management facility 122 may be able discover threats that were not detected on one of the compute instances 10-26, or policy violation, such transmittal of information that should not be communicated unencrypted.

The threat management facility 101 may control access to the enterprise facility 102 networks. A network access facility 124 may restrict access to certain applications, networks, files, printers, servers, databases, and so on. In addition, the network access facility 124 may restrict user access under certain conditions, such as the user's location, usage history, need-to-know data, job position, connection type, time of day, method of authentication, client-system configuration, or the like. Network access policies may be provided by the policy management facility 112, and may be developed by the enterprise facility 102, or pre-packaged by a supplier. Network access facility 124 may determine if a given compute instance 10-22 should be granted access to a requested network location, e.g., inside or outside of the enterprise facility 102. Network access facility 124 may determine if a compute instance 22, 26 such as a device outside the enterprise facility 102 may access the enterprise facility 102. For example, in some cases, the policies may require that when certain policy violations are detected, certain network access is denied. The network access facility 124 may communicate remedial actions that are necessary or helpful to bring a device back into compliance with policy as described below with respect to the remedial action facility 128. Aspects of the network access facility 124 may be provided, for example, in the security agent of the endpoint 12, in a wireless access point 11, in a firewall 10, as part of application protection 150 provided by the cloud, and so on.

In some implementations, the network access facility 124 may have access to policies that include one or more of a block list, a black list, an allowed list, a white list, an unacceptable network site database, an acceptable network site database, a network site reputation database, or the like of network access locations that may or may not be accessed by the client facility. Additionally, the network access facility 124 may use rule evaluation to parse network access requests and apply policies. The network access rule facility 124 may have a generic set of policies for all compute instances, such as denying access to certain types of websites, controlling instant messenger accesses, or the like. Rule evaluation may include regular expression rule evaluation, or other rule evaluation method(s) for interpreting the network access request and comparing the interpretation to established rules for network access. Classifiers may be used, such as neural network classifiers or other classifiers that may be trained by machine learning.

The threat management facility 101 may include an asset classification facility 160. The asset classification facility will discover the assets present in the enterprise facility 102. A compute instance such as any of the compute instances 10-26 described herein may be characterized as a stack of assets. The one level asset is an item of physical hardware. The compute instance may be, or may be implemented on physical hardware, and may have or may not have a hypervisor, or may be an asset managed by a hypervisor. The compute instance may have an operating system (e.g., Windows®, MacOS®, Linux®, Android®, iOS®). The compute instance may have one or more layers of containers. The compute instance may have one or more applications, which may be native applications, e.g., for a physical asset or virtual machine, or running in containers within a computing environment on a physical asset or virtual machine, and those applications may link libraries or other code or the like, e.g., for a user interface, cryptography, communications, device drivers, mathematical or analytical functions and so forth. The stack may also interact with data. The stack may also or instead interact with users, and so users may be considered assets.

The threat management facility may include entity models 162. The entity models may be used, for example, to determine the events that are generated by assets. For example, some operating systems may provide useful information for detecting or identifying events. For examples, operating systems may provide process and usage information that are accessed through an application programming interface (API). As another example, it may be possible to instrument certain containers to monitor the activity of applications running on them. As another example, entity models for users may define roles, groups, permitted activities and other attributes.

The event collection facility 164 may be used to collect events from any of a wide variety of sensors that may provide relevant events from an asset, such as sensors on any of the compute instances 10-26, the application protection facility 150, a cloud computing instance 109 and so on. The events that may be collected may be determined by the entity models. There may be a variety of events collected. Events may include, for example, events generated by the enterprise facility 102 or the compute instances 10-26, such as by monitoring streaming data through a gateway such as firewall 10 and wireless access point 11, monitoring activity of compute instances, monitoring stored files/data on the compute instances 10-26 such as desktop computers, laptop computers, other mobile computing devices, and cloud computing instances 19, 109. Events may range in granularity. An example event may be communication of a specific packet over the network. Another example event may be identification of an application that is communicating over a network. These and other events may be used to determine that a particular endpoint includes or does not include actively updated security software from a trusted vendor.

The event logging facility 166 may be used to store events collected by the event collection facility 164. The event logging facility 166 may store collected events so that they can be accessed and analyzed by the analytics facility 168. Some events may be collected locally, and some events may be communicated to an event store in a central location or cloud facility. Events may be logged in any suitable format.

Events collected by the event logging facility 166 may be used by the analytics facility 168 to make inferences and observations about the events. These observations and inferences may be used as part of policies enforced by the security management facility 122. Observations or inferences about events may also be logged by the event logging facility 166.

When a threat or other policy violation is detected by the security management facility 122, the remedial action facility 128 may be used to remediate the threat. Remedial action may take a variety of forms, including collecting additional data about the threat, terminating or modifying an ongoing process or interaction, sending a warning to a user or administrator, downloading a data file with commands, definitions, instructions, or the like to remediate the threat, requesting additional information from the requesting device, such as the application that initiated the activity of interest, executing a program or application to remediate against a threat or violation, increasing telemetry or recording interactions for subsequent evaluation, (continuing to) block requests to a particular network location or locations, scanning a requesting application or device, quarantine of a requesting application or the device, isolation of the requesting application or the device, deployment of a sandbox, blocking access to resources, e.g., a USB port, or other remedial actions. More generally, the remedial action facility 122 may take any steps or deploy any measures suitable for addressing a detection of a threat, potential threat, policy violation or other event, code or activity that might compromise security of a computing instance 10-26 or the enterprise facility 102.

Example Computing Device 200

Figure 2:
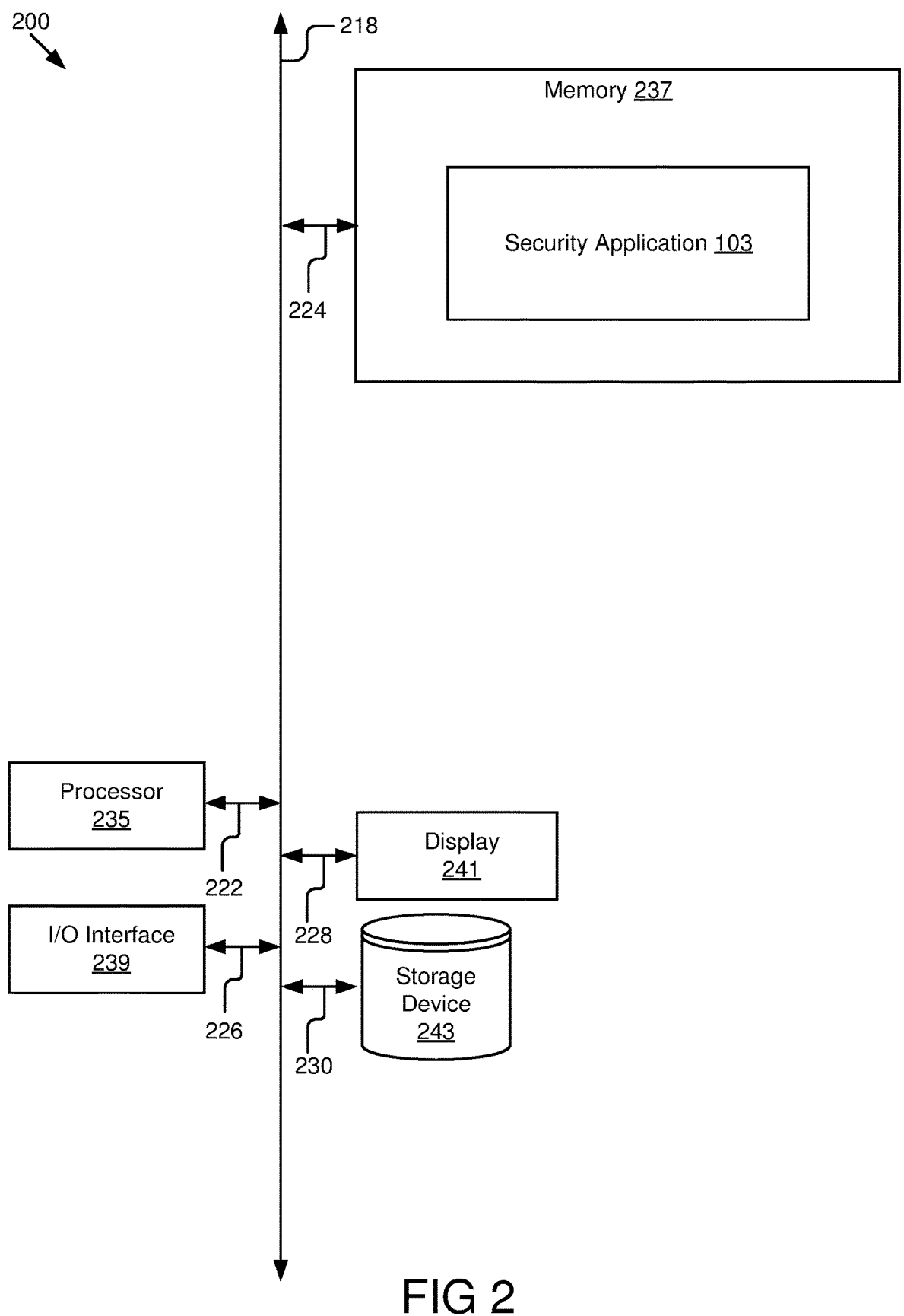
FIG. 2 is a block diagram of an example computing device, according to some embodiments described herein.

FIG. 2 is a block diagram of an example computing device 200 that may be used to implement one or more features described herein. Computing device 200 can be any suitable computer system, server, or other electronic or hardware device. In some embodiments, computing device 200 is endpoint 22 or mobile device 26 in FIG. 1.

In some embodiments, computing device 200 includes a processor 235, a memory 237, an I/O interface 239, a display 241, and a storage device 243, all coupled via a bus 218.

The processor 235 includes an arithmetic logic unit, a microprocessor, a general-purpose controller, or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 illustrates a single processor 235, multiple processors 235 may be included. In different embodiments, processor 235 may be a single-core processor or a multicore processor. Other processors (e.g., graphics processing units), operating systems, sensors, displays, and/or physical configurations may be part of the computing device 200. The processor 235 is coupled to the bus 218 for communication with the other components via signal line 222.

The memory 237 may be a computer-readable media that stores instructions that may be executed by the processor 235 and/or data. The instructions may include code and/or routines for performing the techniques described herein. The memory 237 may be a dynamic random access memory (DRAM) device, a static RAM, or some other memory device. In some embodiments, the memory 237 also includes a non-volatile memory, such as a static random access memory (SRAM) device or flash memory, or similar permanent storage device and media including a hard disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the security application 103, which is described in greater detail below. The memory 237 is coupled to the bus 218 for communication with the other components via signal line 224.

The I/O interface 239 can provide functions to enable interfacing the computing device 200 with other systems and devices. Interfaced devices can be included as part of the computing device 200 or can be separate and communicate with the computing device 200. For example, network communication devices, storage devices (e.g., memory 237 and/or storage device 243), and input/output devices can communicate via the I/O interface 239. In another example, the I/O interface 239 can receive data, such as an input dataset, from an enterprise facility 102 and deliver the data to the security application 103 and components of the security application 103, such as the processing module 202. In some embodiments, the I/O interface 239 can connect to interface devices such as input devices (keyboard, pointing device, touchscreen, microphone, camera, scanner, sensors, etc.) and/or output devices (display devices, speaker devices, printers, monitors, etc.). The I/O interface 239 is coupled to the bus 218 for communication with the other components via signal line 226.

Some examples of interfaced devices that can connect to I/O interface 239 can include a display 241 that can be used to display content, e.g., an identification of a process that is associated with a security threat. The display 241 can include any suitable display device such as a liquid crystal display (LCD), light emitting diode (LED), or plasma display screen, cathode ray tube (CRT), television, monitor, touchscreen, three-dimensional display screen, or other visual display device. The display 241 may be coupled to the bus 218 via signal line 228.

The storage device 243 stores data related to the security application 103. For example, the storage device 243 may store data associated with the security application 103, such as training data, enterprise environment information, and user feedback. The storage device 243 may be coupled to the bus 218 via signal line 230.

FIG. 2 illustrates a computing device 200 that executes an example security application 103 stored in the memory 237. While the security application 103 is illustrated as being stored in a single type of memory 237, as will be described in greater detail below with reference to FIG. 3, the memory 237 may be divided into a user space and a kernel space and the security application 103 may include a kernel-device driver that records information about processes in the kernel memory.

In some embodiments, the security application 103 identifies one or more software processes that execute on the computing device 200 that perform file operations including one or more of opening a file, reading a file, writing a file, or transmitting a file over a network. The security application 103 may store, in a kernel space of an operating system on the computing device, for each software process of the one or more software processes identification information about the file. Responsive to determining that a triggering event has occurred, the software application 103 may prevent deletion of the file, determine one or more attributes of a suspicious process that accessed the file, request that a separate component analyze event journal records in relation to a time interval that overlaps with when the suspicious process accessed the file, or transmit a cryptographic hash of the file to a server, such as the threat management facility 101 in FIG. 1.

Example Memory Organization as User Space and Kernel Space

Figure 3:
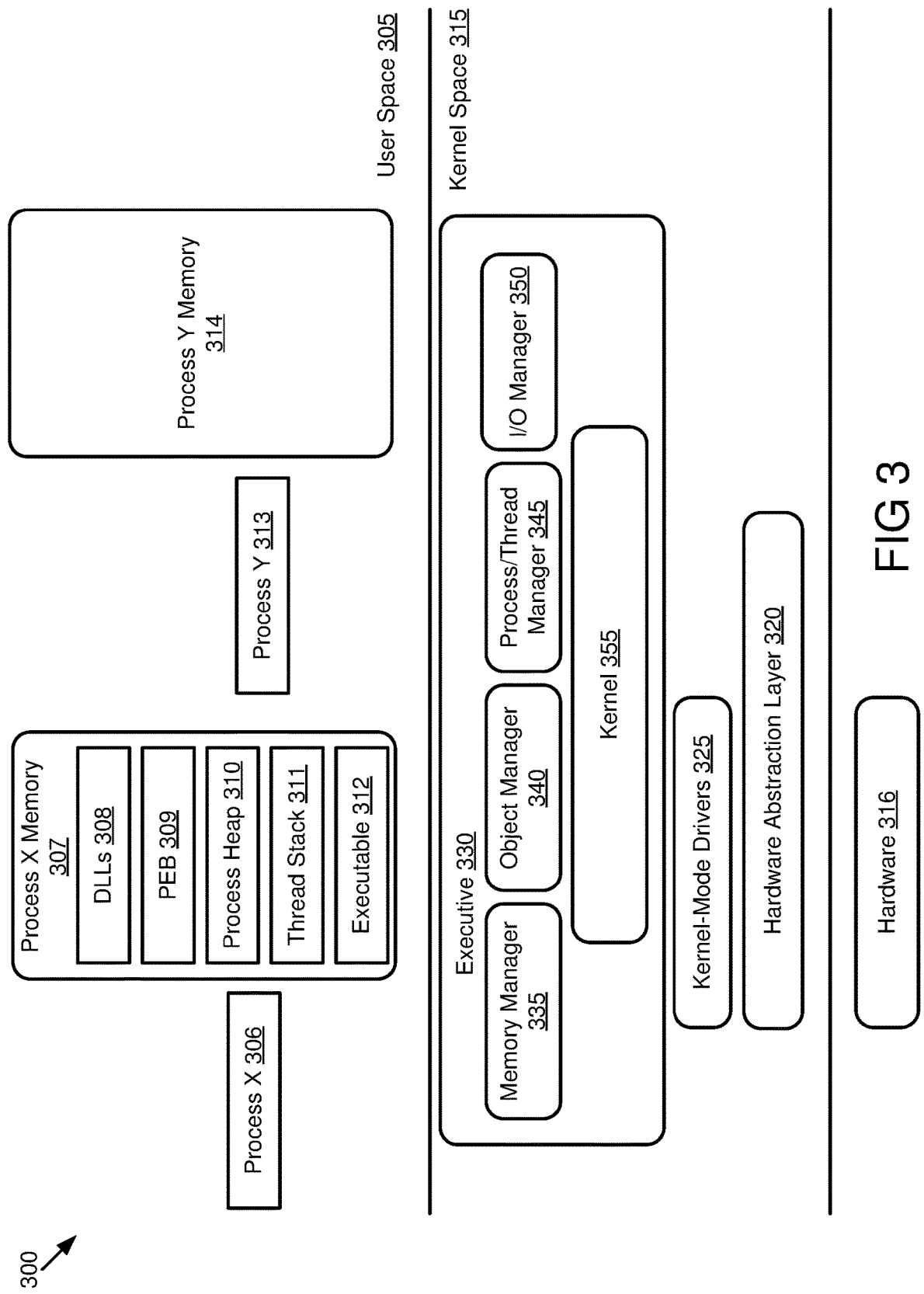
FIG. 3 is a block diagram illustrating an example memory organization of a computing device into user space and kernel space, according to some embodiments described herein.

FIG. 3 is a block diagram 300 illustrating an example memory organization of a computing device into user space 305 and kernel space 315. In some embodiments, the computing device is an endpoint. When a user double-clicks on a program containing a sequence of instructions, a process is created. For example, FIG. 3 illustrates process X 306 and process Y 313. The process can include threads.

The operating system assigns each new process a private memory address space in a section of virtual memory, referred to as process memory. Process memory is the memory used by user applications. Process memory is within the user space 305. Virtual memory also includes kernel memory, which is also referred to as kernel space 315. Virtual addresses have corresponding physical addresses where the actual data resides.

During execution, a process X 306 accesses process X memory 307 within the user space. Process X memory 307 may include one or more of the following: one or dynamic linked libraries (DLLs) 308; a process environment block (PEB) 309; a process heap 310; a thread stack 311; and an executable 312. Process Y memory 314 may include similar components as process X memory 307.

The kernel space 315 includes a hardware abstraction layer 320, one or more kernel-mode drivers 325, and an executive component 330. Hardware 316 may include one or more processors and other non-memory hardware (e.g., I/O devices, peripherals, network interfaces, etc.). The hardware abstraction layer 320 isolates the operating system from the hardware 316 and implements functionality to support execution of the operating system and applications on different hardware platforms.

The DLLs 308 include libraries that contain code and/or data that can be used by more than one program at the same time. In some instances, the executable 312 and the DLLs 308 may not be permitted access to the kernel space 315 and may not directly interact with the hardware 316. The PEB 309 contains information about the memory location where the executable 312 is loaded in memory and full path to the executable on disk storage of a computing device.

The process heap 310 specifies the dynamic input that the process 306 receives. The thread stack 311 represents the dedicated range of process memory allocated to each thread of process X 306. In some implementations, each thread is allocated a respective stack. Function arguments, local variables, and return addresses may be stored in thread stack 311. When a program on the disk is double clicked (or otherwise launched) and a process is created, the executable 312 associated with the program is loaded into the process X memory 307.

The kernel-mode drivers 325 invoke functions exposed by the hardware abstraction layer 320 to interact with the hardware 316, instead of directly communicating with the hardware 316.

The executive component 330 implements system service routines, which can be called by programs executing in the user space 305. The executive component 330 also implements other operating system components, such as the memory manager 335, the object manager 340, the process/thread manager 345, and the I/O manager 350. The kernel 355 implements low-level operating system services and exposes sets of routines, which provide high-level services.

As mentioned above, a process is created when a user executes a program (or a program is launched via other mechanisms, e.g., automatically; by another program; in response to a system event; etc.) containing program instructions. For example, the user may use an input device, such as a mouse, keyboard, or other input device, to interact with the program and cause its execution. The process executable image and its associated DLLs 308 are loaded into the process memory by a loader. The process is a container for one or more threads that execute the code. Each thread executes in the user mode and the kernel space. Each thread has at least one user-space stack and at least one kernel-space stack. For example, software that permits the execution of 32-bit x86 applications on a 64-bit operating system (e.g., Wow64) may have process threads have two user-space stacks-one each for 32-bit and 64-bit.

In some embodiments, the program calls a function using an application programming interface (API) that provides access to one or more functions from system service routines implemented by the executive 330 in the kernel space 315. For example, the program may invoke the WriteFile( ) API to write from memory to a file. In general, WriteFile( ) is a function within the Windows® operating system that writes data to a specified file and/or input/output device. The WriteFile( ) API may be provided to a user space program by the executive 330. In some embodiments, the kernel-mode drivers 325 also maintain one or more data structures (e.g., process tables) that include information about the acquisition of data including that the file was written. The kernel-mode drivers 325 may track events related to a file, such as for example, when a file is opened, read, written, closed, copied, or moved to a different memory (or storage) location. Copying the file or moving the file over a network, e.g., using a transmission control protocol/internet protocol (TCP/IP) or other connection, is referred to as exfiltration.

In some embodiments, a kernel-mode driver 325 tracks the information about the acquisition of data with the help of the executive component 330 by using file system filters or a minifilter. For example, Windows Filtering Platform (WFP) in Microsoft Windows® filters network traffic.

A file system filter, such as a minifilter, intercepts requests targeted at a file system or another file system filter driver. By intercepting the request before it reaches its intended target, a minifilter can extend or replace functionality provided by the original target of the request.

The term filter in the file system filter may refer to file-related operations performed by a filter driver, such as logging, observing, modifying, or preventing operations from occurring.

Logging includes a filter driver storing observed information from file system requests for future use. For example, the filter driver may record information about events that occur in association with the filters and callbacks such as the identity of processes that access the file. The filter driver may be configured to write one or more log entries to a log file on a storage device, such as a local storage device, a network storage device, or combinations thereof. As one example, event journals are a type of log file written by the filter driver.

Observing refers to the filter driver's access to a file system request (i.e., open file) that includes information such as a file pathname, requested permissions, etc. In general, most of the arguments used in user space APIs like CreateFile( ) which is a function within the Windows® operating system that creates a file, are passed along with the request. A filter driver can view the request before it is processed by the file system (pre) and after the request has been completed (post). For example, this allows a filter driver to observe a file open attempt in the pre-callback and see that it succeeded in the post-callback. Any and all information from pre- and post-callbacks can be maintained by the filter driver.

Modifying occurs when the kernel-mode driver 325 modifies parameters and other information in calls that it filters. For example, if a process asked for read and write permissions when opening a file, the kernel-mode driver 325 may change this to read permissions only and allow the call.

Blocking occurs when the filter driver responds to requests directly. For example, a filter driver may observe an attempt to open a protected file for write and delete access and return a STATUS_ACCESS_VIOLATION or other error code, causing the request to fail.

Example Process Table

Figure 4:
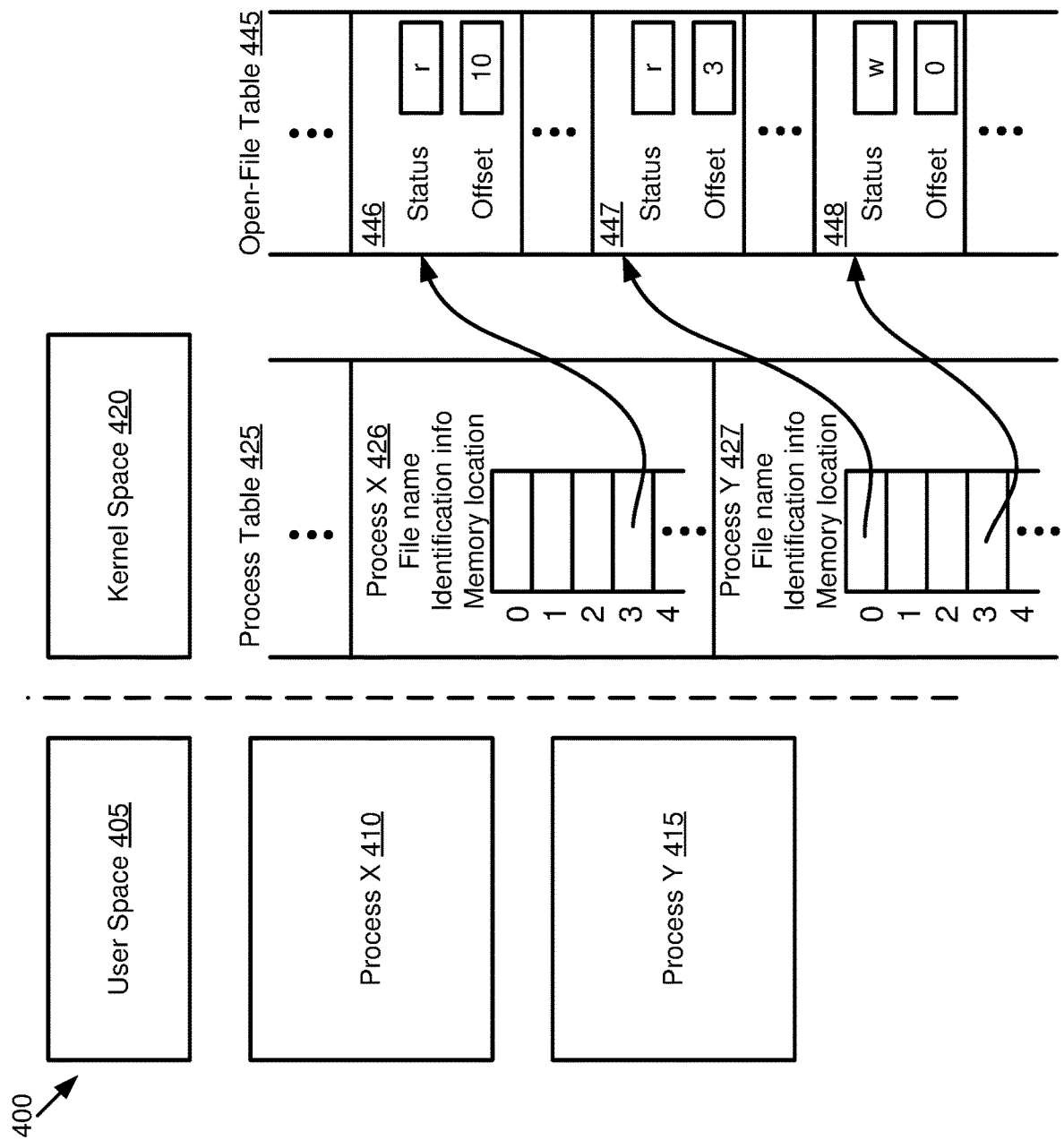
FIG. 4 is a block diagram that illustrates an example of memory organization of a computing device user space and kernel space, according to some embodiments described herein.

FIG. 4 is a block diagram 400 that illustrates an example of memory organization of a computing device user space 405 and kernel space 420. The kernel space 420 includes a process table 425. The kernel-mode driver (e.g., driver 325) utilizes a data structure in kernel space 420 to store information about processes executing on a computing device.

In some embodiments, the data structure is referred to as a process table 425. The user space 405 is utilized by processes, such as process X 410 and process Y 415, to store data related to the processes. Each process has an entry in the process table 425 that is stored in the kernel space 420. For example, the process table 425 includes an entry for process X 426 and an entry for process Y 427.

When a process performs file operations (e.g., creates a file, opens a file, reads the file, writes to the file, deletes the file, copies the file, transmits the file over a network, etc.), the kernel can store information about the event in the process table 425. For example, an entry in the process table 425 may include identification information about the file and a memory location associated with the software process or a memory descriptor list (MDL) that describes a physical memory location of a buffer associated with the software process. The identification information about the file may include one or more of a checksum of the file, a cryptographic hash of the file, a sample of the file, a name of the file, and/or a memory location associated with reading the file. A checksum is a value that represents a "signature" of the file and may be used for authentication purposes. In some embodiments, every file is assigned a checksum value after executing a cryptographic hash on the file.

The kernel mode driver keeps track of each connection to a file (e.g., different processes that access the file). Since the same file may have many open connections (with one or more processes), the connection is distinct from the file.

In some embodiments the connection information is stored in an open-file table 445. The open-file table 445 has an entry for each connection and each connection contains the connection status (e.g., read or write) and the current offset in the file (i.e., the next position to be accessed in the file).

Continuing with the example, when process X 410 (with associated process table 425 record 426) reads a file, the open-file table 445 includes an entry 446 with the status of "r" to indicate that the file is read by the process X 410 and an offset of 10. When process Y 415 (with associated process table 425 record 427) reads a file, the open-file table 445 includes a first entry 447 with the status of "r" to indicate that the file is read and an offset of 3. When process Y 415 (with associated process table 427 record) writes to the file, a second entry 448 includes the status of "w" to indicate that the file is written to and has an offset of 0. For different types of file accesses by various processes, associated entries may be stored in the open-file table 445.

When a process writes to a file, the kernel-mode driver may track where the file was written to. For example, the data may be written to a file on a network share (e.g., storage device shared over a network and available as a drive mounted on the operating system), a network location (e.g., a remote device that can be written to over the network via its network address), using an alternative stack (e.g., WinPcap), to an external device, such as a camera or external memory, etc.

When a file is written on a network share, the kernel-mode driver may identify the write buffer where the file is written and identify the particular file that is written on the network share based on information, such as the file name. When a file is written to a network location, the kernel-mode driver may be able to identify that the file was written by uploading the file via a browser or through the use of a package, such as through transmission of data to cloud storage e.g., over file transfer protocol (FTP), over hypertext transfer protocol (HTTP/HTTPS), etc. In some embodiments, when a file is written to a network location, a filter such as the Windows® Filtering Platform (WFP) filter may be used to identify the file in the memory based on a memory descriptor list that points to the buffer and the original memory. Alternatively, in Windows®, the kernel-mode driver may identify the file using the Winsock Send( ) command using a Microsoft® Detours style hook to identify the original buffer, where Detours is a software package for re-routing Win32 APIs underneath applications. Lastly, the file may be located using a network driver interface specification (NDIS) lightweight filter to filter packets on non-Microsoft stacks. The alternative stack may include WinPcap®, which is used to exfiltrate the data.

When the kernel-mode driver identifies the location of a file (associated with a process) in memory, the kernel-mode driver may confirm that the file is the same as one associated with another process, such as a file-opening process, to track how the file is being used by different processes. In some embodiments, the kernel-mode driver may determine a size of a file that was read and a size of a file that was written to and infer that the files are the same based on the sizes being the same.

In some embodiments, performing a checksum or a cryptographic hash of a file may have computational advantages. For example, in some endpoint devices, every downloaded file is scanned (by endpoint security software) for suspicious features and hashed. If a checksum or a cryptographic hash of every file is performed, the scanning process may no longer be followed by a hash and the process of tracking the files may be streamlined.

Example Triggering Events

In some embodiments, the information about different processes may be used to prevent suspicious activities (by malicious processes) from occurring or be used to gain insight into a suspicious activity, such as how the suspicious activity was able to gain access to the endpoint. A triggering event prompts remedial steps to be taken. The triggering event may be serious threats such as malware being detected on the endpoint, a ransomware email being received, or may be subtle, such as suspicious processes that may be associated with a threat, such as a process that encrypts a file and then transmits the file over a network.

In some embodiments, when a triggering event occurs, one or more actions of the following actions are performed: preventing deletion of a file, determining one or more attributes of a suspicious process that accessed the file, requesting that a separate component analyze event journal records in relation to a time interval that overlaps with when the suspicious process accessed the file, and/or transmitting a cryptographic hash of the file to a server. The cryptographic hash of the file may be transmitted to the server for future comparisons.

In some embodiments, a kernel-mode driver or other component of the kernel space may determine that the triggering event includes suspicious activities based on one or more attributes of a suspicious process that accessed a file. For example, ransomware may encrypt a file, make a copy of the file, and then delete the file. In another example, a suspicious activity may include reading a file, copying the file, transmitting the file across a network (e.g., exfiltration), and then deleting the file. In response to these types of triggering events, the kernel-mode driver may prevent deletion of the file.

The determination of a triggering event may be based on the steps occurring in a particular order or in a particular way because the same or similar steps may be performed, but in a different order, for legitimate reasons. For example, some backup procedures read an original file, write the original file to a larger file on a hard drive, compress the larger file, encrypt the larger file, and delete the original file. Because the kernel-mode driver has access to a process table that records the different steps, the kernel-mode driver may identify the triggering event as including encryption and copying a file before deletion, but may not identify the triggering event as including writing an original file to a larger file.

In another example, a scan may not be performed if a file is copied and saved to a different location but the scan is performed if a file is copied, exfiltrated, and the original file is deleted because there are legitimate reasons for a process to move data. In yet another example, processes may be determined to be suspicious if a portable document file (PDF) is written into a different PDF file, but may not be determined to be suspicious if the PDF file is written into a zip file and encrypted because that is a typical process used to transmit documents.

In some embodiments, the one or more attributes of a suspicious process may include identifying that a website was visited from the endpoint device. For example, a browser may provide a list of the uniform resource locators (URLs) visited by a user. Although some browsers do not directly provide a list of the URLs, the list of URLs in such cases is recorded to a history file that can be accessed by the kernel-mode driver or another component of the kernel space to determine the list of URLs.

In some embodiments, responsive to a triggering event occurring, a separate component (e.g., an application in the user space or a separate component from the kernel-mode driver in the kernel space) is requested to analyze event journal records in relation to a time interval that overlaps with when the suspicious process accessed the file. For example, a user space component may perform scans of the event journal records based on file access, a schedule, a user request, etc. In another example, the operating system may provide event traces that are used to determine actions on the endpoint. In yet another example, operating system traces may be used to generate event journal records of actions on the endpoint. The event journal records may include information about different aspects of processes on the endpoint, such as processes, threads, files, registry information, event traces, etc. In some embodiments, the event journal records are stored on disk are temporarily cached in kernel memory to enable components in the kernel space to access the information.

In some embodiments, based on analyzing the event journal records, the kernel-mode driver determines an amount of data received from the network within the time interval prior to the file being created, determines if the amount of data received from the network within the time interval matches a size of the file, and responsive to determining that the amount of data received matches the size of the file, identifies or tags one or more processes as suspicious. This may occur, for example, if a suspicious process creates a new file in order to evade tracking of the original file.

For example, when a process includes opening a first file, the kernel-mode driver may generate a first cryptographic hash of a portion of the first file. If a software process performs transmitting a second file, the kernel-mode driver may generate a second cryptographic hash of the second file. If kernel-mode driver determines that the first cryptographic hash matches the second cryptographic hash, the kernel-mode driver may identify that the software process that performed transmission of the second file over the network is suspicious. This overcomes the challenges presented when moving the file results in the kernel-mode driver being unable to track the file because the kernel-mode driver can track the identity of the file through comparing cryptographic hashes. Other identifying techniques are also possible, such as taking a random sample of data from files.

In some embodiments, if a first cryptographic hash does not match the second cryptographic hash (for example, because the file has been encrypted or compressed), the kernel-mode driver may identify a code library that was accessed before the second file was transmitted. For example, the code library may be DLL or code resident in the original process executable. If the code library includes compression and/or encryption functionality (or other functionality that results in transformation of the file, while retaining files contents), the kernel-mode driver may tag a software process as suspicious. In some embodiments, the kernel-mode driver may also prevent deletion of the first file upon tagging a software process as suspicious.

In some embodiments, the kernel-mode driver or another component generates a cryptographic hash of a file and transmits the cryptographic hash of the file to a server, such as a server that is part of the threat management facility 101 or the enterprise facility 102 in FIG. 1. The server may include records of cryptographic hashes of data and provide the kernel-mode driver with information about whether the cryptographic hash was associated with a suspicious process.

Example Method 500

FIG. 5 is an example flow diagram of a method 500 to monitor data acquisition and exfiltration. The method 500 is performed by a computing device 200 of FIG. 2 or components of the kernel space 315 in FIG. 3 including the kernel-mode driver 325. In some implementations, the method 500 may be performed by an endpoint device 22 and/or a mobile device 26, or other user device coupled to a network.

The method 500 may begin at block 502. At block 502, a kernel-mode driver executing on an endpoint device identifies one or more software processes that execute on the endpoint device and that perform at least one file operation selected from the group of opening a file, reading the file, writing the file, transmitting the file over a network, and combinations thereof. In some embodiments, responsive to identifying that the file operation comprises transmitting the file over the network, a filter is applied to determine information about the file that is transmitted over the network. Block 502 may be followed by block 504.

At block 504, a kernel space of an operating system on the endpoint device stores, for each software process of the one or more processes: identification information about the file. In some embodiments, the identification information about the file includes one or more selected from the group of a checksum of the file, a sample of the file, a name of the file, and a memory location associated with reading the file. In some embodiments, the kernel space further stores, for each software process of the one or more software processes, information about a memory location in the kernel space associated with the software process or a memory descriptor list that describes a physical memory location of a buffer associated with the software process. Block 504 may be followed by block 506.

At block 506, responsive to determining that a triggering event has occurred, one or more actions are performed selected from the group of: preventing deletion of the file, determining the one or more attributes of a suspicious process that accessed the file, requesting that a separate component analyze event journal records in relation to a time interval that overlaps with when the suspicious process accessed the file, transmitting a cryptographic hash of the file to a server, and combinations thereof. In some embodiments, responsive to the triggering event including determining that the one or more attributes of the suspicious process that accessed the file, the method further comprises identifying a website that was visited from the endpoint device.

As a result of the method 500, a security application tracks software processes, which can be used to identify suspicious processes as they occur and/or, after a suspicious activity has occurred, to determine how the suspicious activity was able to access an endpoint.

In some embodiments, where the one or more actions comprise requesting that the separate component analyze the event journal records and the method further comprises: determining an amount of data received from the network within the time interval prior to the file being created, determining if the amount of data received from the network within the time interval matches a size of the file, and responsive to determining that the amount of data received matches the size of the file, identifying the one or more software processes as suspicious. In some embodiments, responsive to the one or more software processes opening the file, generating the cryptographic hash of a portion of the first file; responsive to the one or more software processes transmitting a second file, generating a second cryptographic hash of the second file; and determining that the first cryptographic hash matches the second cryptographic hash and identifying the one or more software processes that performed the transmitting the second file over the network is suspicious. In some embodiments, responsive to determining that the first cryptographic hash does not match the second cryptographic hash, identifying a code library that was accessed before the second file was transmitted and based on determining that the code library includes compression or encryption functionality, tagging the one or more software processes as suspicious. In some embodiments, the file is also prevented from being deleted.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the embodiments can be described above primarily with reference to user interfaces and particular hardware. However, the embodiments can apply to any type of computing device that can receive data and commands, and any peripheral devices providing services.

Reference in the specification to "some embodiments" or "some instances" means that a particular feature, structure, or characteristic described in connection with the embodiments or instances can be included in at least one implementation of the description. The appearances of the phrase "in some embodiments" in various places in the specification are not necessarily all referring to the same embodiments.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The embodiments of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including optical disks, ROMs, CD-ROMs, magnetic disks, RAMS, EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

What is claimed is:

1. A computer-implemented method performed at an endpoint device, the method comprising:
   identifying, with a kernel-mode driver executing on the endpoint device, one or more software processes that execute on the endpoint device and that perform opening a first file;
   storing, in a kernel space of an operating system on the endpoint device, for each software process of the one or more software processes, identification information about the first file;
   responsive to the one or more software processes opening the first file, generating a first cryptographic hash of a portion of the first file;
   responsive to determining that a triggering event has occurred,
      transmitting the first cryptographic hash of the first file to a server;
   responsive to the one or more software processes transmitting a second file over a network, generating a second cryptographic hash of the second file; and
   determining that the first cryptographic hash matches the second cryptographic hash and identifying the one or more software processes that performed the transmitting the second file over the network as suspicious.

2. The computer-implemented method of claim 1, wherein the one or more software processes further perform transmitting the first file over the network and the method further comprises:
   applying a filter to determine information about the first file that is transmitted over the network.

3. The computer-implemented method of claim 1, further comprising storing, in the kernel space of the operating system on the endpoint device, for each software process of the one or more software processes, information about a memory location in the kernel space associated with the software process or a memory descriptor list that describes a physical memory location of a buffer associated with the software process.

4. The computer-implemented method of claim 1, wherein responsive to determining that the triggering event has occurred, the method further comprises
   requesting that a separate component analyze event journal records in relation to a time interval that overlaps with when a suspicious process accessed the first file;
   determining an amount of data received from the network prior to the first file being created;
   determining if the amount of data received from the network matches a size of the first file; and
   responsive to determining that the amount of data received matches the size of the first file, providing an additional determination that the one or more software processes are suspicious.

5. The computer-implemented method of claim 1, wherein responsive to determining that the triggering event has occurred, the method further comprises:
   determining one or more attributes of a suspicious process that accessed the first file; and
   identifying a website that was visited from the endpoint device.

6. The computer-implemented method of claim 1, wherein responsive to determining that the triggering event has occurred, the method further comprises requesting that a separate component analyze event journal records in relation to a time interval that overlaps with when a suspicious process accessed the first file.

7. The method of claim 1, wherein the identification information about the first file includes one or more selected from a group of a checksum of the first file, a sample of the first file, a name of the first file, a memory location associated with reading the first file, and combinations thereof.

8. An endpoint device comprising:
one or more processors; and
one or more computer-readable media, having instructions stored thereon that, when executed by the one or more processors, cause the one or more processors to perform operations comprising:
identifying, with a kernel-mode driver executing on the endpoint device, one or more software processes that execute on the endpoint device and that perform opening a first file, reading the file;
storing, in a cache in a kernel space of an operating system on the endpoint device, for each software process of the one or more software processes, identification information about the first file;
responsive to the one or more software processes opening the first file, generating a first cryptographic hash of a portion of the first file;
responsive to determining that a triggering event has occurred,
transmitting a cryptographic hash of the first file to a server;
responsive to the one or more software processes transmitting a second file over a network, generating a second cryptographic hash of the second file;
responsive to determining that the first cryptographic hash does not match the second cryptographic hash, identifying a code library that was accessed before the second file was transmitted; and
based on determining that the code library includes compression or encryption functionality, tagging the one or more software processes as suspicious.

9. The endpoint device of claim 8, wherein the one or more software processes further perform transmitting the first file over the network and the operations further comprise:
applying a filter to determine information about the first file that is transmitted over the network.

10. The endpoint device of claim 8, wherein the operations further comprise storing, in the cache in the kernel space of the operating system on the endpoint device, for each software process of the one or more software processes, information about a memory location in the kernel space associated with the software process or a memory descriptor list that describes a physical memory location of a buffer associated with the software process.

11. The endpoint device of claim 8, wherein responsive to determining that the triggering event has occurred, the operations further comprise
requesting that a separate component analyze event journal records;
determining an amount of data received from the network prior to the first file being created;
determining if the amount of data received from the network matches a size of the first file; and
responsive to determining that the amount of data received matches the size of the first file, providing an additional determination that the one or more software processes are suspicious.

12. The endpoint device of claim 8, wherein responsive to determining that the triggering event has occurred, the operations further comprise:
determining one or more attributes of a suspicious process that accessed the first file; and
identifying a website that was visited from the endpoint device.

13. The endpoint device of claim 8, wherein the operations further comprise responsive to tagging the one or more software processes as suspicious, preventing deletion of the first file.

14. The endpoint device of claim 8, wherein responsive to determining that the triggering event has occurred, the operations further comprise requesting that a separate component analyze event journal records in relation to a time interval that overlaps with when a suspicious process accessed the first file.

15. A computer-program product that includes one or more non-transitory computer-readable media with instructions stored thereon that, when executed by one or more computers, cause the one or more computers to perform operations comprising:
identifying, with a kernel-mode driver executing on an endpoint device, one or more software processes that execute on the endpoint device and that perform opening a first file;
storing, in a cache in a kernel space of an operating system on the endpoint device, for each software process of the one or more software processes, identification information about the first file;
responsive to the one or more software processes opening the first file, generating a first cryptographic hash of a portion of the first file;
responsive to determining that a triggering event has occurred,
transmitting the first cryptographic hash of the first file to a server;
responsive to the one or more software processes transmitting a second file over a network, generating a second cryptographic hash of the second file; and
determining that the first cryptographic hash matches the second cryptographic hash and identifying that the one or more software processes that performed the transmitting the second file over the network as suspicious.

16. The computer-program product of claim 15, wherein the one or more software processes further perform transmitting the first file over the network and the operations further comprise:
applying a filter to determine information about the first file that is transmitted over the network.

17. The computer-program product of claim 15, wherein the operations further comprise storing, in the cache in the kernel space of the operating system on the endpoint device, for each software process of the one or more software processes, information about a memory location in the kernel space associated with the software process or a memory descriptor list that describes a physical memory location of a buffer associated with the software process.

18. The computer-program product of claim 15, wherein responsive to determining that the triggering event has occurred, the operations further comprise
requesting that a separate component analyze event journal records;
determining an amount of data received from the network prior to the first file being created;
determining if the amount of data received from the network matches a size of the first file; and
responsive to determining that the amount of data received matches the size of the first file, providing an additional determination that the one or more software processes are as suspicious.

19. The computer-program product of claim 15, wherein responsive to determining that the triggering event has occurred, the operations further comprise:

determining one or more attributes of a suspicious process that accessed the first file; and identifying a website that was visited from the endpoint device.

20. The computer-program product of claim 15, wherein responsive to determining that the triggering event has occurred, the operations further comprise requesting that a separate component analyze event journal records in relation to a time interval that overlaps with when a suspicious process accessed the first file.

* * * * *